Patented Nov. 12, 1940

2,221,020

UNITED STATES PATENT OFFICE 2,221,020

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application November 2, 1938, Serial No. 238,412

11 Claims. (Cl. 260—165)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of my invention have the probable general formulae:

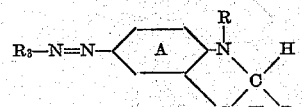

I

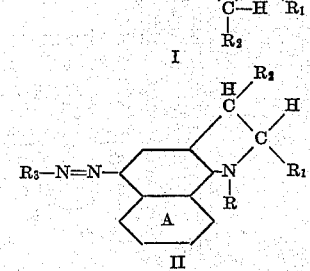

II and

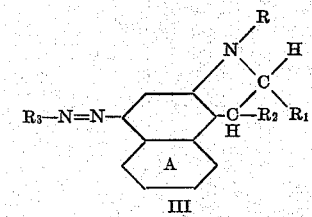

III wherein $R_3$ represents the residue of an aromatic nucleus, R, $R_1$ and $R_2$ each represents hydrogen, an alkyl group, an allyl group, a cycloalkyl group or an aryl group, and $R_1$ and $R_2$ may be in addition a hydroxyl group, an alkoxy group or an aralkyl group and A means the benzene nuclei so designated may be substituted with a monovalent substituent such as a hydroxyl group, a halogen atom, an alkoxy group, an alkyl group or an amino group.

It will be understood that alkyl, as used herein, unless otherwise stated, includes not only unsubstituted alkyl groups, such as a methyl group, an ethyl group or a propyl group but also substituted alkyl groups such as β-hydroxyethyl, β,γ-hydroxypropyl, β-methoxyethyl or β-ethoxyethyl, for example. Illustrative of halogen may be mentioned chlorine, bromine and iodine. Similarly, illustrative alkoxy groups include methoxy, ethoxy and propoxy. Illustrative of cycloalkyl and aralkyl may be mentioned cyclohexyl and benzyl, respectively.

The azo dye compounds of my invention can be prepared by diazotizing a primary aromatic amine and coupling the diazonium compound obtained with a coupling compound having one of the general formulae:

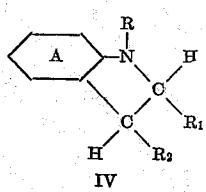

IV

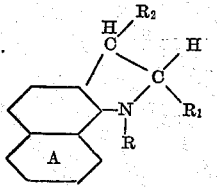

V and

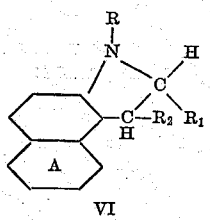

VI wherein A, R, $R_1$ and $R_2$ have the meaning previously assigned to them. No substituent which would prevent coupling should be present. To illustrate, no substituent should be present in the position in which coupling would otherwise take place.

As previously indicated, the nuclear non-sulfonated aromatic azo dye compounds of my invention constitue valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated $R_3$ contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein $R_3$ is a phenyl residue are generally advantageous. Said phenyl residue may be substituted as clearly shown herein.

The following examples illustrate the preparation of the azo dye compounds of my invention:

*Example 1*

13.8 grams of p-nitroaniline are placed in 200 cc. of water containing 40 cc. of hydrochloric acid and diazotized at 10–20° C. with 6.9 grams of sodium nitrite.

14.9 grams of

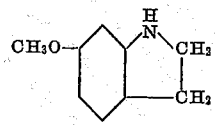

are dissolved in cold dilute hydrochloric acid and the diazo solution is added. After standing for a short time the mixture is made neutral to Congo red paper with sodium acetate and when coupling is complete the dye is filtered off, washed and dried.

*Example 2*

17.3 grams of p-nitro-o-chloroaniline are diazotized as described in Example 1.

16.0 grams of

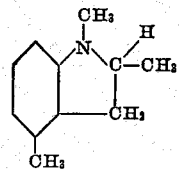

are dissolved in cold dilute hydrochloric acid and coupling is carried out as previously described.

*Example 3*

21.7 grams of p-nitro-o-bromoaniline are diazotized as described in Example 1.

24.1 grams of

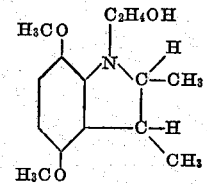

are dissolved in cold dilute hydrochloric acid and coupling is carried out as previously described.

*Example 4*

16.8 grams of p-nitro-o-methoxyaniline are diazotized as described in Example 1.

0.1 gram mole of

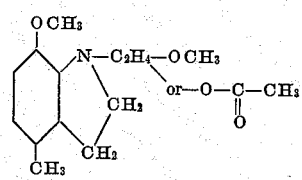

are dissolved in cold dilute hydrochloric acid and coupling is carried out as previously described.

*Example 5*

18 grams of 4-amino-3-nitrophenylmethylketone are diazotized as described in Example 1.

0.1 gram mole of

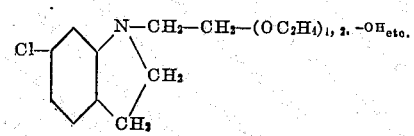

are dissolved in dilute HCl and coupling is carried out as previously described.

*Example 6*

12.8 grams of o-chloroaniline are diazotized in the usual manner.
20.9 grams of

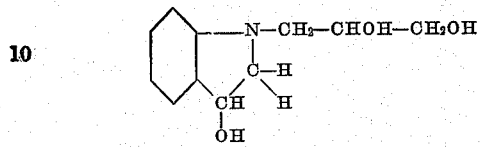

are dissolved in well iced water and the diazo solution is added with stirring. The mixture is slowly made neutral to litmus with sodium carbonate. When coupling is complete, the dye is salted out, filtered, and dried.

*Example 7*

13.5 grams of p-aminoacetophenone are diazotized in the usual manner.
32.1 grams of

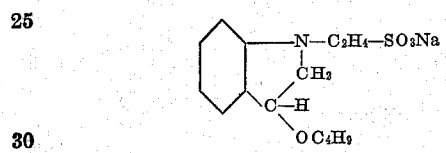

are dissolved in water and coupling is carried out as described in Example 6.

*Example 8*

(A) 7.6 grams of sodium nitrite are dissolved in 53 cc. of sulfuric acid (sp. gr. 1.84), warmed to 70° C. and cooled to room temperature.

(B) 18.3 grams of 2,4-dinitroaniline are dissolved in 220 cc. of hot acetic acid and rapidly cooled to room temperature.

While stirring A, add B over a period of 30 min., maintaining a temperature of 10–15° C. After the addition, stir at room temperature for 30–45 minutes and then add 1 gram of urea.
25.7 grams of

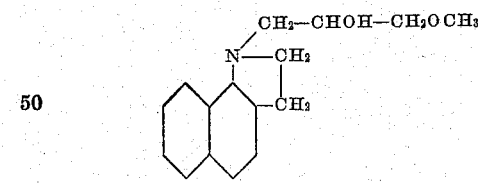

are dissolved in cold dilute hydrochloric acid and coupling is carried out as previously described.

*Example 9*

21.8 grams of 2,4-dinitro-6-chloroaniline are diazotized as described in Example 8.
37.3 grams of

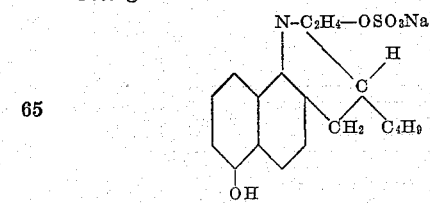

are dissolved in cold dilute hydrochloric acid and coupling is carried out as previously described.

*Example 10*

26.2 grams of 2,4-dinitro-6-bromoaniline are diazotized as described in Example 8.
40.5 grams of

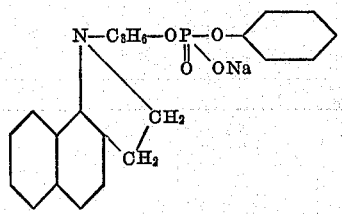

are dissolved in dilute hydrochloric acid and coupling is carried out as previously described.

*Example 11*

83.4 grams of

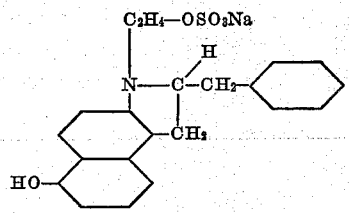

are coupled with 26.8 grams of dianisidine in cold dilute hydrochloric acid. A disazo dye compound is obtained.

*Example 12*

20.7 grams of p-aminoazobenzene are diazotized as described in Example 1.
30.1 grams of

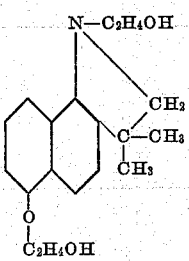

are dissolved in water and coupling is carried out as previously described.

*Example 13*

18.6 grams of 5-nitro-2-aminobenzenesulfonic acid are dissolved in 150 cc. of water containing 6 grams of sodium carbonate. Then 6.9 grams of sodium nitrite are added. Ice and 11 cc. of 36% hydrochloric acid are added.
39.3 grams of

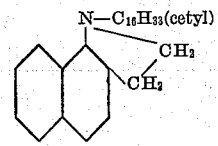

are dissolved in dilute hydrochloric acid and coupling is carried out as previously described.

The following tabulation further illustrates the compounds included within the scope of my invention together with the color they produce on cellulose acetate silk. The compounds indicated below may be prepared by diazotizing the amines listed under the heading "Amine" and coupling with the compounds specified in the column entitled "Coupling component." The diazotization and coupling reaction may, for example, be carried out following the general procedure described in Examples 1 to 13, inclusive.

| Amine | Coupling component | Color on cellulose acetate silk |
|---|---|---|
| o-Chloroaniline | (1) Cyclohexane ring with N(CH₃)—CH₂—CH< and OCH₃ substituent | Yellow. |
| Do | (2) Cyclohexane ring with OCH₃, N(C₂H₄OH)—CH, OH, OCH₃ substituents | Do. |
| Do | (3) Cyclohexane ring with OCH₃, N—C₂H₄OH (β and γ)—CH₂—CH, CH₃, OC₄H₉ | Do. |
| Do | (4) Cyclohexane ring with N—C₂H₄—(OC₂H₄)₁,₂, etc.—OH; —CH—CH₃; Cl, OCH₃ | Do. |
| Do | (5) Cyclohexane ring with N—C₂H₄—SO₃Na; CH₂—C(CH₃)(CH₃) | Do. |
| Do | (6) Cyclohexane ring with N—C₂H₄—OSO₃Na; CH, CH₂, CH₂, CH₃ | Do. |
| Do | (7) Cyclohexane ring with N—C₃H₆—OCH₃ or —O—C(=O)—CH₃; CH₂, CH₂, OH | Do. |
| Do | (8) Cyclohexane ring with N—C₄H₉—O—P(=O)(ONa)(OC₁₆H₃₃ (cetyl)); CH₂, CH₂ | Do. |
| Do | (9) Cyclohexane ring with N—cyclohexyl; CH₂, CH₂ | Do. |
| o-Bromoaniline | 1–9 above | Do. |
| p-Iodoaniline | do | Do. |
| 1-amino-2,4-dichlorobenzene | do | Orange. |
| 1-amino-2,4-dibromobenzene | do | Do. |
| p-Aminoacetophenone | do | Do. |
| o-Nitroaniline | do | Do. |
| m-Nitroaniline | do | Do. |
| p-Nitroaniline | do | Yellow-red. |
| 1-amino-2-methyl-4-nitro-benzene | do | Do. |
| 1-amino-2-propyl-4-nitrobenzene | do | Do. |
| 1-amino-2-ethoxy-4-nitrobenzene | do | Do. |
| 1-amino-2-chloro-4-nitrobenzene | do | Rubine. |
| 3-nitro-4-aminophenyl-methylketone | do | Do. |
| 1-amino-2-nitro-4-bromobenzene | do | Orange-red. |
| 1-amino-2-nitro-4-propoxybenzene | do | Do. |
| 1-amino-3-nitro-6-chlorobenzene | do | Orange. |
| 1-amino-2-nitro-5-methylbenzene | do | Do. |

| Amine | Coupling component | | Color on cellulose acetate silk |
|---|---|---|---|
| 5-nitro-2-aminophenyl-methylsulfone | 1-9 above | | Rubine. |
| 2-amino-6-methoxy-benzothiazole | do | | Do. |
| 1-amino-2,4-dinitro-6-chlorobenzene | do | | Violet to reddish-blue. |
| 1-amino-2,4-dinitro-naphthalene | do | | Do. |
| 1-amino-2,4,6-trinitro-benzene | do | | Reddish-blue to blue. |
| 2,4-dinitroaniline | (10) | ![structure with CH₃, CH₃, NH] | Purple. |
| Do | (11) | ![structure with CH₃, CH, CH₃, N, C₂H₄OH] | Do. |
| Do | (12) | ![structure with CH₂, H, C, CH₃, N, glyceryl, HO-] | Blue-green. |
| Do | (13) | ![structure with HO, CH₃, H, C, CH₃, N, C₂H₆OH, CH₃O-] | Blue. |
| Do | (14) | ![structure with N-C₂H₄-SO₃Na, CH₂, CH₂, CH₃O-] | Do. |
| 2,4-dinitro-6-chloro-aniline | 10-11 above | | Do. |
| 2,4-dinitro-6-bromo-aniline | 12-14 above | | Blue-green. |

In order that the preparation of the azo dye compounds of my invention may be clearly understood, the preparation of a number of the coupling compounds having the general formulae numbered IV, V and VI is indicated hereinafter. These compounds may be prepared by hydrogenating the corresponding indole or oxindole derivatives; that is, compounds containing the ring system

and

wherein R, R₁ and R₂ have the meaning previously given them, fused to a substituted benzene or naphthalene nucleus. Hydrogenation catalysts which can be employed include Raney nickel, nickel on kieselguhr or copper chromite, for example. When R in the compound undergoing treatment is hydrogen, it may be converted to an alkyl group by alkylation in known manner, for example, with an alkyl halide, an alkylene oxide or an alkyl sulfate.

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of my invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey U. S. Letters Patent No. 2,115,030, issued April 26, 1938. For a more detailed description as to how the water soluble azo dyes of my invention may be employed for the coloration of textile materials made of or containing organic derivatives of cellulose, silk and wool or mixtures of these, reference may be had to McNally and Dickey U. S. Letters Patent No. 2,107,898, issued February 8, 1938.

I claim:

1. The azo dye compounds selected from the group of azo compounds having the general formulae:

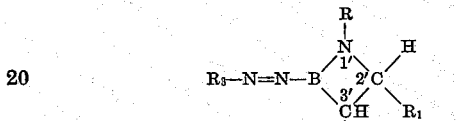

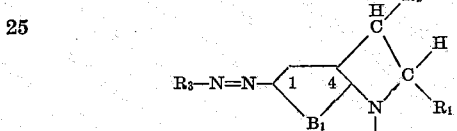

and

wherein $R_3$ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, $B_1$ represents the residue of an aryl nucleus of the benzene series containing but one benzene ring joined to the 1 and 4 positions of the nuclei shown through adjacent carbon atoms, R, $R_1$ and $R_2$ each represents a member selected from the group consisting of hydrogen, an alkyl group, an allyl group, a cyclohexyl group and an aryl nucleus of the benzene series containing but one benzene ring and $R_1$ and $R_2$ may be in addition a member selected from the group consisting of a hydroxyl group, an alkoxy group and a benzyl group.

2. The azo dye compounds selected from the group of azo compounds having the general formulae:

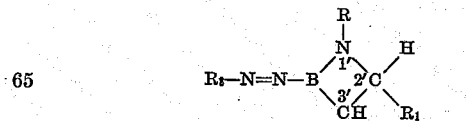

and

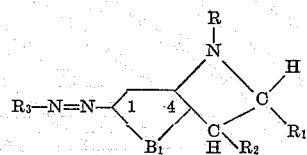

wherein $R_3$ represents the residue of a phenyl nucleus, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, $B_1$ represents the residue of an aryl nucleus of the benzene series containing but one benzene ring joined to the 1 and 4 positions of the nuclei shown through adjacent carbon atoms, R, $R_1$ and $R_2$ each represents a member selected from the group consisting of hydrogen, an alkyl group, an allyl group, a cyclo-hexyl group and an aryl nucleus of the benzene series containing but one benzene ring and $R_1$ and $R_2$ may be in addititon a member selected from the group consisting of a hydroxyl group, an alkoxy group and a benzyl group.

3. The azo dye compounds selected from the group of azo compounds having the general formulae:

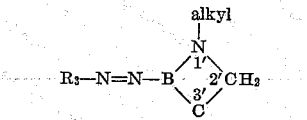

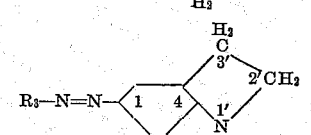

and

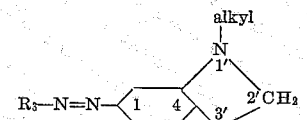

wherein $R_3$ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, $B_1$ represents the residue of an aryl nucleus of the benzene series containing but one benzene ring joined to the 1 and 4 positions of the nuclei shown through adjacent carbon atoms.

4. The azo dye compounds having the general formula:

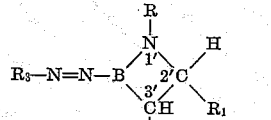

wherein $R_3$ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, R, R₁ and R₂ each represents a member selected from the group consisting of hydrogen, an alkyl group, an allyl group, a cyclohexyl group and an aryl nucleus of the benzene series containing but one benzene ring and R₁ and R₂ may be in addition a member selected from the group consisting of a hydroxyl group, an alkoxy group and a benzyl group.

5. The azo dye compounds having the general formula:

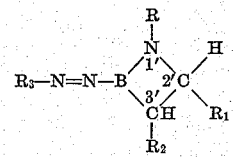

wherein R₃ represents the residue of a phenyl nucleus, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, R, R₁ and R₂ each represents a member selected from the group consisting of hydrogen, an alkyl group, an allyl group, a cyclohexyl group and an aryl nucleus of the benzene series containing but one benzene ring and R₁ and R₂ may be in addition a member selected from the group consisting of a hydroxyl group, an alkoxy group and a benzyl group.

6. The azo dye compounds having the general formula:

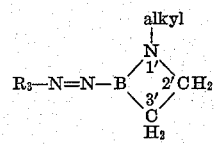

wherein R₃ represents the residue of a phenyl nucleus, B represents the residue of an aryl nucleus of the benzene series containing but one benzene ring and wherein the nitrogen atom numbered 1' and the carbon atom numbered 3', are attached to the benzene nucleus B in para and meta position, respectively, to the azo bond.

7. The azo dye compounds having the general formula:

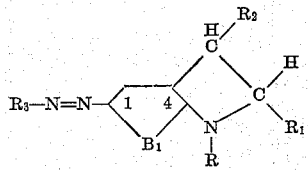

wherein R₃ represents a member selected from the group consisting of an aryl nucleus of the benzene series and an aryl nucleus of the naphthalene series, B₁ represents the residue of an aryl nucleus of the benzene series containing but one benzene ring joined to the 1 and 4 positions of the nucleus shown through adjacent carbon atoms, R, R₁ and R₂ each represents a member selected from the group consisting of hydrogen, an alkyl group, an allyl group, a cyclohexyl group and an aryl nucleus of the benzene series containing but one benzene ring and R₁ and R₂ may be in addition a member selected from the group consisting of a hydroxyl group, an alkoxy group and a benzyl group.

8. Material made of or containing an organic derivative of cellulose colored with a nuclear non-sulfonated azo dye compound selected from the group of azo compounds having the general formulae:

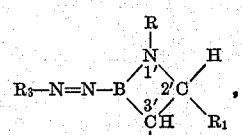

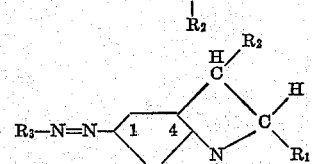

and

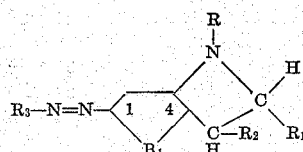

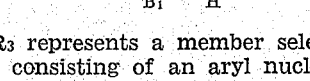

wherein R₃ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, B₁ represents the residue of an aryl nucleus of the benzene series containing but one benzene ring joined to the 1 and 4 positions of the nuclei shown through adjacent carbon atoms, R, R₁ and R₂ each represents a member selected from the group consisting of hydrogen, an alkyl group, an allyl group, a cyclohexyl group and an aryl nucleus of the benzene series containing but one benzene ring and R₁ and R₂ may be in addition a member selected from the group consisting of a hydroxyl group, an alkoxy group and a benzyl group.

9. Material made of or containing an organic derivative of cellulose colored with a nuclear non-sulfonated azo dye compound having the general formula:

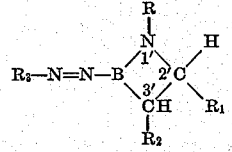

wherein R₃ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, R, R₁ and R₂ each represents a member selected from the group consisting of hydrogen, an alkyl group, an allyl group, a cyclohexyl group and an aryl nucleus of the benzene series containing but one benzene ring and R₁ and R₂ may be in addition a member selected from the group consisting of a hydroxyl group, an alkoxy group and a benzyl group.

10. A cellulose acetate colored with a nuclear non-sulfonated azo dye compound selected from the group of azo compounds having the general formulae:

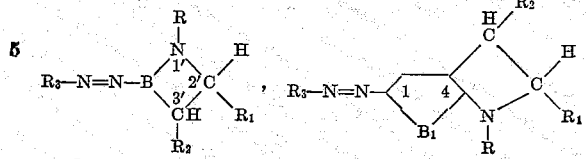

and

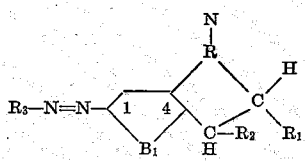

wherein $R_3$ represents a member selected from the group consisting of an aryl nucleus of the benzene series and an aryl nucleus of the naphthalene series, B represents the residue of an aryl nucleus of the benzene series containing but one benzene ring and wherein the nitrogen atom numbered 1' and the carbon atom numbered 3' are attached to the benzene nucleus B in para and meta position, respectively, to the azo bond, $B_1$ represents the residue of an aryl nucleus of the benzene series containing but one benzene ring joined to the 1 and 4 positions of the nuclei shown through adjacent carbon atoms, R, $R_1$ and $R_2$ each represents a member selected from the group consisting of hydrogen, an alkyl group, an allyl group, a cyclohexyl group and an aryl nucleus of the benzene series containing but one benzene ring and $R_1$ and $R_2$ may be in addition a member selected from the group consisting of a hydroxyl group, an alkoxy group and a benzyl group.

11. A cellulose acetate colored with a nuclear nonsulfonated azo dye compound having the general formula:

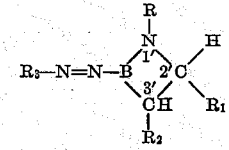

wherein $R_3$ represents the residue of a phenyl nucleus, B represents the residue of an aryl nucleus of the benzene series containing but one benzene ring and wherein the nitrogen atom numbered 1' and the carbon numbered 3' are attached to the benzene nucleus B in para and meta position, respectively, to the azo bond, R, $R_1$ and $R_2$ each represents a member selected from the group consisting of hydrogen, an alkyl group, an allyl group, a cyclohexyl group and an aryl nucleus of the benzene series containing but one benzene ring and $R_1$ and $R_2$ may be in addition a member selected from the group consisting of a hydroxyl group, an alkoxy group and a benzyl group.

JOSEPH B. DICKEY.

CERTIFICATE OF CORRECTION.

Patent No. 2,221,020.                                              November 12, 1940.

JOSEPH B. DICKEY.

It is hereby certified that error appears in the printed specification of the above numbered patent requiring correction as follows: Page 4, third column, line 11 from bottom of page, for "Do." read --Yellow--; same page and column, line 10 from bottom, for "Yellow-red" read --Red--; page 8, second column, line 19, claim 11, after the word "carbon" insert --atom--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.